United States Patent

Hagerty

[11] 4,052,818
[45] Oct. 11, 1977

[54] METHOD AND APPARATUS FOR CONTAINERIZING PLANTS WITH A SELF-WATERING SYSTEM

[76] Inventor: Mary L. Hagerty, 10 1/2 LeGare St., Charleston, S.C. 29401

[21] Appl. No.: 702,445

[22] Filed: July 6, 1976

Related U.S. Application Data

[63] Continuation-in-part of Ser. No. 566,138, April 8, 1975, abandoned.

[51] Int. Cl.² ............................................. A01G 27/00
[52] U.S. Cl. .......................................... 47/81; 47/58
[58] Field of Search ................... 47/58, 66, 73, 74, 78, 47/79–82, 76, 61, 62

[56] References Cited

U.S. PATENT DOCUMENTS

| 1,129,554 | 2/1915 | Courtney | 47/79 |
|---|---|---|---|
| 2,081,337 | 5/1937 | Lockyer | 47/81 |
| 3,067,543 | 12/1962 | Bracey | 47/80 |
| 3,331,154 | 7/1967 | Schilling | 47/61 |
| 3,483,656 | 12/1969 | Baumann | 47/62 |
| 3,683,548 | 8/1972 | Hagerty | 47/81 |
| 3,739,524 | 6/1973 | Rose | 47/81 |

FOREIGN PATENT DOCUMENTS

| 2,364,868 | 12/1973 | Germany | 47/80 |
|---|---|---|---|
| 652,457 | 2/1963 | Italy | 47/81 |
| 1,104 of | 3/1875 | United Kingdom | 47/81 |

OTHER PUBLICATIONS

Hamilton, A., "Scheme for Healthy Houseplants", New York Times, 11/8/53, Section 2, p. X-35.

*Primary Examiner*—Edgar S. Burr
*Assistant Examiner*—James R. Feyrer
*Attorney, Agent, or Firm*—William E. Mouzavires

[57] ABSTRACT

Plants are containerized with a self-watering system by forming a water reservoir in the bottom of a container with a screen supported over the reservoir spaced from the water by means of a coarse growing medium received in the reservoir. Above the screen is a fine growing medium which, prior to initial introduction in the container, is prevented from dropping through the screen by means of a permeable easily decomposable sheet material such as filter paper placed over the screen. The roots of the plant are placed in the fine growing medium, however, due to the size of the mesh of the screen, specialized or water roots are developed which extend through the screen and into the reservoir to help feed the plant with water. The fine growing medium receives its water from the reservoir through means of one or more wicks which extend between the reservoir and the fine growing medium above the reservoir. Water is supplied to the reservoir by a watering tube extending vertically through a preformed aperture in the screen. The level of water in the reservoir is indicated by a float in the watering tube including a stem which projects from the top of the tube when the reservoir contains water. The top of the stem is marked with indicia to determine whether the reservoir is empty of water or has been filled to a predetermined maximum level below the screen. To prevent withdrawal of the stem from the watering tube, an intermediate portion of the tube is provided with a cross member acting as a stop engageable with the bottom of the float to prevent withdrawal upwardly through the tube.

12 Claims, 10 Drawing Figures

U.S. Patent  Oct. 11, 1977  Sheet 1 of 2  4,052,818

METHOD AND APPARATUS FOR CONTAINERIZING PLANTS WITH A SELF-WATERING SYSTEM

RELATED APPLICATIONS

This application is a continuation-in-part of my prior pending United States patent application Ser. No. 566,138, filed Apr. 8, 1975 and entitled "Method And Apparatus For Watering Plants In A Container" and which has since been abandoned.

OBJECTS OF INVENTION

The present invention generally relates to the art of growing and caring for plants in a container, and more specifically to a novel method and apparatus for containerizing plants and caring for the plants after they have been containerized.

A principal object of the present invention is to provide novel and improved methods and apparatus for containerizing plants and caring for the plants after they have been containerized to ensure proper plant growth and a healthy plant. Included herein is the provision of methods and apparatus for containerizing a plant with a self-watering system which may be utilized to ensure that the plant receives a predetermined proper amount of water to avoid starvation of the plant by lack of water and to avoid drowning of the plant by excessive water. Included herein is such a method and apparatus which will permit "specialized" or water roots to be developed by the plant in a water reservoir included in the plant container to ensure a constant supply of water for the other roots of the plant which are received in a fine growing medium separated from the water reservoir.

Another object of the present invention is to provide apparatus which will carry out the above objects and which may be distributed to the consumer in kit form so as to be easily implemented by the user in containerizing a home plant or other plants. Also included herein is such apparatus which may be supplied in kit form for use in the commercial growing and caring for plants. Further included herein is such apparatus which may be utilized to containerize a plant in a non-ceramic container such as can be made, for example, from plastic with different shapes and sizes and which container also does not require a water drainage hole.

Yet another object of the present invention is to provide a novel self-watering system for a plant which automatically ensures that the plant receives a predetermined quantity of water to avoid water starvation at one extreme and overwatering causing drowning of the plant at the other extreme. Included herein is the provision of such a self-watering system having a novel indicator means for signalling to the plant owner that the plant requires additional water or, in the opposite situation, the plant has been fed with an excessive amount of water. Further included herein is the provision of such a self-watering system which will not detract from the appearance of the plant and yet will still be effective to achieve its intended purpose.

DRAWINGS

The above and other objects will become apparent from the following more detailed description taken in conjunction with the attached drawings in which.

Figure 8:
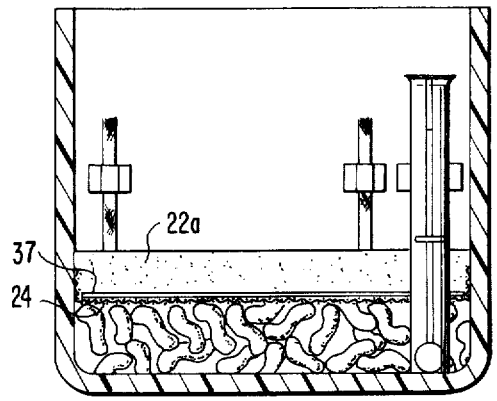
FIG. 8 is a view similar to FIG. 7 but showing the next step in the containerization process wherein a layer of fine growing medium is placed over the filter paper.
Figure 9:
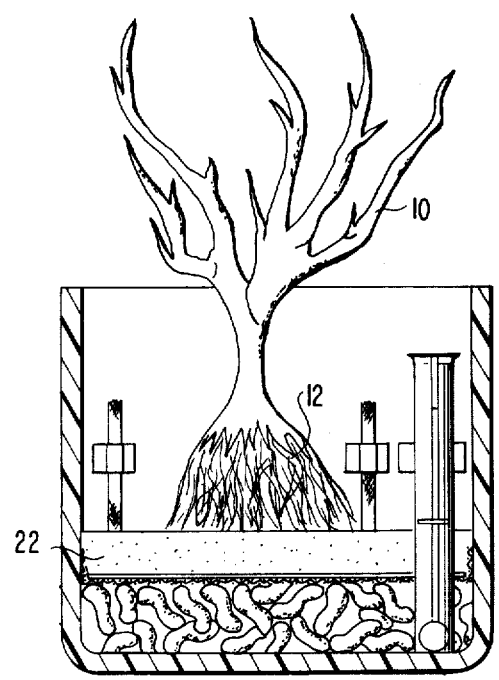
Figure 10:
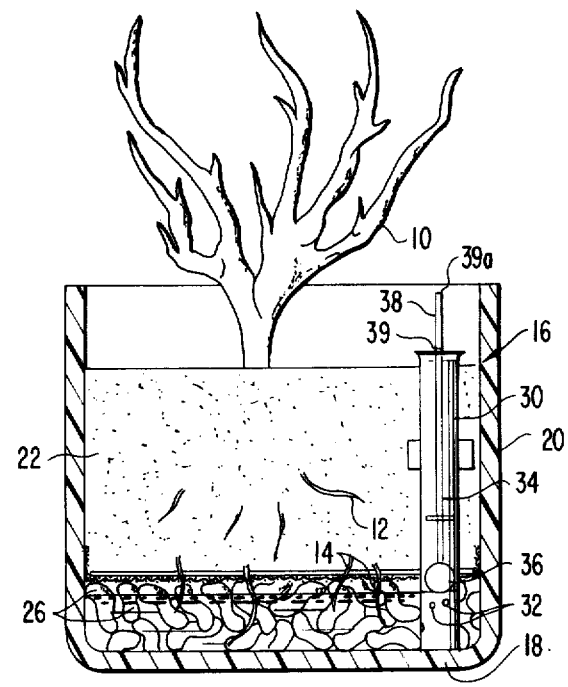

FIG. 9 is a view similar to FIG. 8 but showing the next step in the containerization process wherein the plant is initially introduced in the container in the fine growing medium; and FIG. 10 is a view similar to FIG. 9 but illustrating the plant after it has been fully containerized and wherein additional fine growing medium has been introduced in the container and with the plant fully embedded therein, and with water having been supplied to the bottom of the container and also with specialized roots having been developed in the water reservoir which takes place, of course, after the initial containerization of the plant.

DETAILED DESCRIPTION

Referring now to the drawings in detail and initially to FIG. 10, there is shown, for illustrative purposes only, a plant 10 which has been containerized in accordance with the present invention in a container generally designated 16 including a horizontal bottom wall 18 and two pairs of opposite upstanding side walls 20 which define a space for receiving plant 10. Although in the specific embodiment, the container 20 has been shown as having a generally square configuration, it will be appreciated that rectangular containers, circular containers or any other shapes may be utilized in carrying out the present invention. Also, although container 16 is disclosed as being plastic, other materials may be utilized.

Plant 10 is shown with normal roots 12 received in a fine growing medium 22, and "specialized" or water roots 14 which have been developed in a water reservoir formed below a screen 24 which extends horizontally throughout a bottom portion of the container below the fine growing medium as will be further described below. Fine growing medium 22 and screen 24 are supported in spaced relation above the level of water in the water reservoir by means of a coarse growing medium which, although preferably is formed by styrafoam pellets 26 having an irregular shape such as a serpentine or S-shape, may also be provided by rocks, solid plastic pellets, glass chips, granite chips, etc. as long as spaces are provided between the coarse growing medium to receive water.

Water is fed to plant roots 12 from the water reservoir by means of wicks 40, not shown in FIG. 10, but which will be described below. In addition, a constant supply of water is ensured for plant roots 12 in the fine growing medium 22 by means of specialized roots 14 which develop in the reservoir in accordance with the present invention. Water is introduced into the reservoir through means of a watering tube 30 having a plurality of apertures 32 in the bottom end portion thereof for discharging water into the reservoir below screen 24; and an upper open end for introducing water into the tube 30. In addition, indicating means is provided in the watering tube to lubricate the level of water in the reservoir; the indicating means including a float comprised of a stem 34, a spherical float 36 and indicia 38 at the top of the stem as will be further described below.

Figure 1:
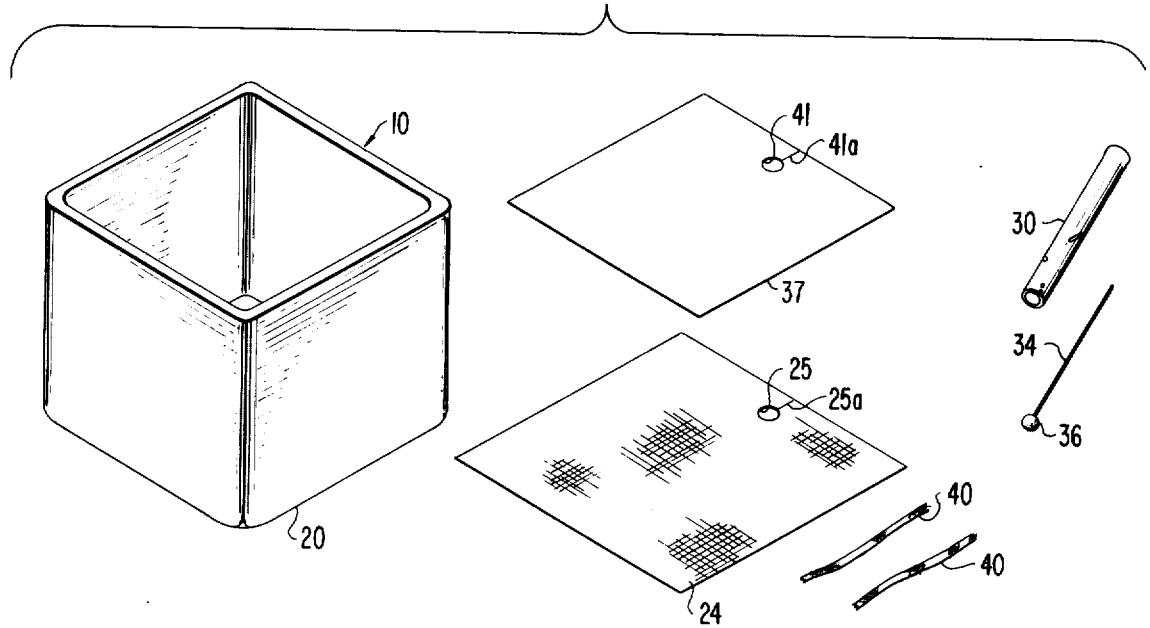
FIG. 1 is a perspective view of a plant container and other parts which may be included in a kit for containerizing a plant (not shown) in the container.

In accordance with the present invention; the apparatus for containerizing the plant 10 may be provided in kit form for convenient distribution to the consumer or other points of use. The kit may or may not include the container 20 since, in many cases, the user may wish to containerize a plant in an existing container or in other containers of his own selection. Referring to FIG. 1, the kit includes screen 24, watering tube 30, float assembly 36, 34, and a plurality of wicks 40. In addition, the kit includes a sheet 37 of permeable material, for example, a sheet of filter paper, which is utilized to prevent the finer particles of the fine growing medium from falling through the screen 24 when the fine growing medium is initially introduced in the container during the containerization process. Another requirement of permeable sheet 37 is that it be easily decomposable upon becoming wet so as not to hinder the growth of specialized roots 14 downwardly through the mesh of screen 24 and into the water reservoir as will be further described below. Although not shown in FIG. 1, the kit also includes a coarse growing medium 26, preferably comprised of styrafoam pellets 26 because they are easily available and light in weight. As indicated above, other coarse growing mediums may be employed.

Figure 4:
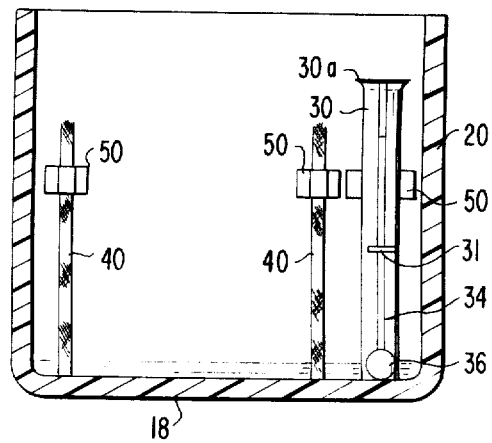
FIG. 4 is an elevational view of the plant container shown in cross section and with a plurality of wicks and the watering tube and float assembly after they have been initially inserted and secured in the container as the initial stage in the containerization of a plant in accordance with the present invention.

Referring now to FIG. 4, the first step in the containerization of the plant, is to locate and secure wicks 40 and the watering tube and float assembly 30, 34, 36 in the container as shown in FIG. 4. Wicks 40 are placed to extend vertically along side wall 20 of the container with their lowermost ends engaging bottom 18 of the container and with their upper ends terminating at a level substantially above the reservoir but below the upper mouth of the container. In this way, wicks 40 will extend substantially throughout the depth of the layer of fine growing medium 22 but will not project above fine growing medium 22 so as to detract from the appearance of the plant. Any suitable attachment method or means any be employed to secure wicks 40 to the container; adhesive tapes 50 being employed in the specific embodiment shown in FIG. 4. Of course, the length of the wicks may be shortened as desired by cutting sections off the top of the wick after the bottom of the wicks have been located against container bottom 18.

Still referring to FIG. 4, watering tube 30 is also placed vertically within the container at a location, preferably adjacent the side wall 20 of the container so as to be accessible for receiving after the plant has been containerized. The lower end of tube 30 is open and rests on bottom 18 of the container. The upper end of tube 30 which is flared at 30a to facilitate pouring of water therein, lies at a level which will coincide or be slightly above the uppermost level of the fine growing medium 22 to be introduced in the container. The length of watering tube 30 is thus designed accordingly and will vary with the depth of the fine growing medium as well as the depth of the container. Any suitable attachment means such as adhesive tape 50 may be employed to temporarily hold watering tube 30 in the container during this initial phase.

Figure 2:
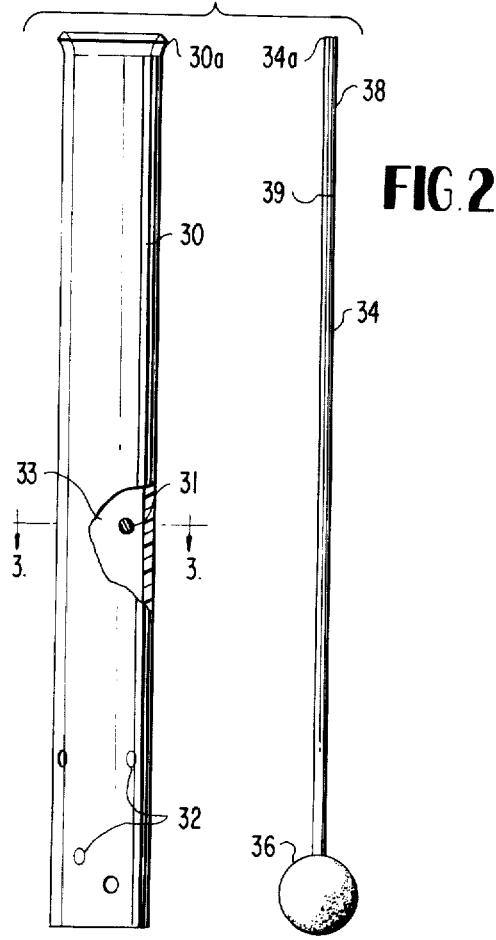
FIG. 2 is an elevational view with certain parts broken away of a watering tube and float assembly utilized in providing a self-watering system in accordance with one of the features of the present invention.
Figure 3:
FIG. 3 is a cross-sectional view taken generally along lines 3—3 of FIG. 2.

It should be noted that watering tube 30 is introduced in the container, as shown in FIG. 4, with the associated float including stem 34 and float member 36 received therein with the spherical float member 36 resting on the bottom 18 of the container. Thus, the float 34, 36 is first introduced into the watering tube 30 and then the tube 30 with the float therein is inserted in the container. Since, in the specific embodiment shown, stop member 31 which is shown in the form of a cross piece extending cordially (offset from the longitudinal axis of the tube) across the interior passage of watering tube 30 (see FIGS. 2 and 3), the float stem 34 should be placed in the watering tube so as to pass through the wide space 33 between stop 31 and the wall of watering tube 30, that is, to the left of stop 31 as shown in FIGS. 2 and 3. As described above, water is introduced into the bottom of the container from the watering tube 30 through means of a plurality of apertures of passages 32 which in the specific embodiment, are shown as being circular and extending through tube 30 at different elevations in the lower end of the tube and a different angular locations spaced around the circumference of the tube. While various types of outlet apertures corresponding to outlet apertures 32 may be employed, it is preferred that a plurality of small apertures approximately $\frac{1}{4}$ inch in diameter be utilized at spaced levels and locations around the circumference of watering tube 30. In this way, large outlets are avoided which could permit sand or other unwanted material from entering into the water reservoir. However, sufficient apertures should be provided, for example, in the specific embodiment there are four apertures provided.

Figure 5:
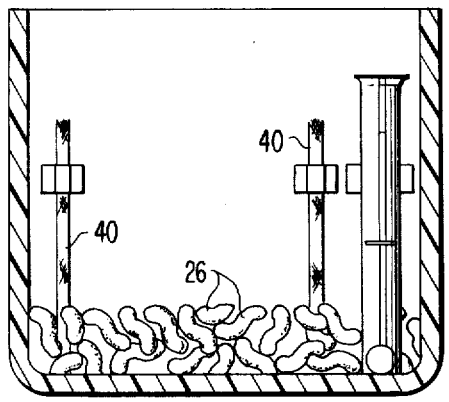
FIG. 5 is a view similar to FIG. 4 but showing the next step in the containerization process wherein a coarse growing medium is introduced into the bottom of the container.

Referring now to FIg. 5, the next step in the containerization of the plant is to introduce the coarse growing medium which, in the specific embodiment shown, is in the form of styrafoam pellets 26 having a generally S-shape; the bulk and the shape of the pellets 26 providing spaces therebetween for receiving the water. The pellets are evenly distributed so as to provide a generally flat area on the top of the pellets for receiving and supporting the screen 24 in a horizontal plane.

Figure 6:
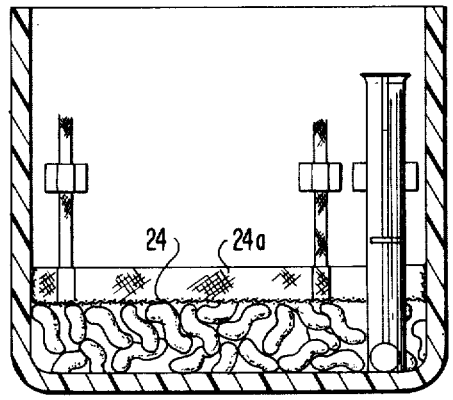
FIG. 6 is a view similar to FIG. 5 but showing the next step in the containerization process wherein a screen is inserted in the container above the coarse growing medium.

Referring now to FIG. 6, screen 24 is next introduced into the container so as to extend throughout and engage upon pellets 26 of the coarse growing medium. Since, in the specific embodiment shown, container 20 has a generally square configuration, screen 24, as shown in FIG. 1, also has a square configuration. However, to facilitate placement of the screen in the container and to provide flexibility for different size containers, the dimensions of the screen 24 are larger than the corresponding dimensions of the container 18. Thus, in introducing the screen; the marginal edge portions 24a of the screen 24 are turned upwardly along side walls 20 of the container as shown in FIG. 6. Although different screen sizes or mesh may be employed depending on the type of plant roots that will be containerized, as well as the type of fine growing medium employed, it has been found that a screen having a mesh size of approximately (1/16 inch squares) will provide effective results while being optimum for different kinds of plants. It is preferred that the screen be made from plastic or fiberglass for longer life. It has also been found that conventional window screening may be employed. Although, as indicated, a screen is utilized in the preferred embodiment to support the fine growing medium, it is conceivable that other types of foraminous members may be employed in certain particular situations.

In order to allow uniform placement of the screen in a horizontal plane above coarse growing medium 26 and without hinderance from watering tube 30, the screen is formed with a precut aperture 25 and severed edge portions or a slit 25a extending aperture 25 to the nearby edge of the screen as shown in FIG. 1. Thus, in placing the screen in the container during the step represented by FIG. 6, the portions of the screen on opposite sides of the aperture 25 and slit 25a may be easily placed about the watering tube 30 with the watering tube received through aperture 25. When finally placed, watering tubes 30 will completely surrounded by the screen portions so that the entire area above coarse growing medium 26 will be covered by screen 24.

Figure 7:
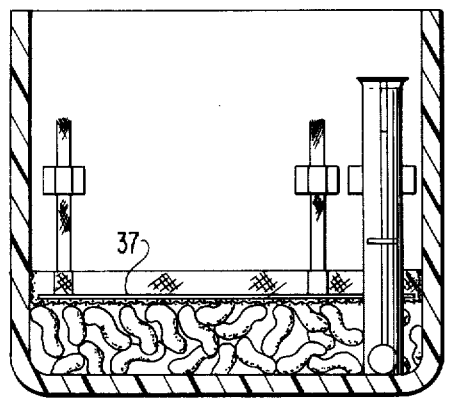
FIG. 7 is a view similar to FIG. 6 but showing the next step in the containerization process wherein a sheet of filter paper is inserted on the screen.

Referring now to FIG. 7, the next step in the process is to lay a sheet of permeable, readily decomposable, material on top of screen 24 to ensure that when the fine growing medium is initially introduced in the container, the finer particles of the fine growing medium will not fail through the screen and into the water reservoir. However, it should be noted that once the soil is moist and the roots begin to grow, the fine growing medium 22 will stay in place above the screen and the sheet of permeable, readily decomposable material, will no longer be needed. It is therefore necessary that the sheet layer 37 be readily decomposable upon contact with water. Although it is preferred that a sheet of filter paper be employed, other materials having the similar characteristics may also be employed. As is similarly provided in screen 24, a circular aperture 41 (FIG. 1) is provided in filter paper 37 for receiving watering tube 30. In addition, a slit 41a is provided to extend between aperture 41 and the nearby edge of filter paper 37 to facilitate placement of the filter paper portions on opposite sides of aperture 41 and slit 41a around watering tube 30.

Referring to FIG. 8, and after filter paper 37 has been laid over screen 24, the next step in the process is to introduce an initial layer 22a of fine growing medium 22 to a depth of approximately 1 above filter paper 40. Any suitable fine growing medium may be employed, however, in one embodiment, a mixture consisting of 50% peat moss and 50% perlite soil additive is utilized. If desired to aid rapid growth of the plant, a quality time release fertilizer can be added to the fine growing medium mixture.

Referring now to FIG. 9, the next step in the process is to introduce the plant 10 in the container with the ball of the roots 12 received upon the layer 22a of fine growing medium 22 previously introduced. Next, additional fine growing medium is introduced into the container around roots 12 and pressed down around the ball of roots 12 until the top of the fine growing medium is just below the mouth of watering tube 30 as shown, for example, in FIG. 10. The plant 10 is now ready to receive its initial supply of water and this is effected by introduction through the mouth 30a of tube 30; the water passing into the reservoir below screen 24 through means of apertures 32 in the lower end portion of tube 30. The precise quantity of water to be added is indicated by means of indicia 38, 39 and 39a provided at spaced levels on the upper end of stem 34 as indicated in FIGS. 2 and 10.

In accordance with another feature of the present invention, it has been discovered that the water level should terminate below the level of screen 24 so as to prevent the water in the reservoir from rising via capillary action through apertures of screen 24 and into the fine growing medium 22 where it can drown roots 12 of the plant. In addition, it has been found that a space of approximately ¼ inch between the uppermost level of the water in the reservoir and screen 24 will effectively avoid the problem of capillary action.

To indicate when this maximum level of water has been reached, indicia 39, which may be any visible mark, is located specifically on the stem 34 so that when the level if water in the bottom of the container is approximately ¼ inch below screen 24, indicia mark 39 will lie in the same plane or generally at the same level of the upper mouth 30a of watering tube 30 as illustrated in FIG. 10. In order to signal when the reservoir is empty of water, another indicia 39a is provided on the stem above indicia 39 to be at the level of mouth 30a of watering tube 30 when the reservoir is empty of water as illustrated in FIG. 9. In the specific embodiment shown, indicia 39a corresponds to the upper end of stem 34. It is preferred that the section 38 of stem 34 between marks 39 and 39a be provided with a color different than the color of the remaining portions of stem 34 (which may be clear plastic color) for contrast. It will thus be seen that if the reservoir is empty of water and therefore requires refilling, stem portion 38 will no longer be visible above the watering tube 30 (see FIG. 9) and this will immediately signal the plant owner to provide a new supply of water. On the other hand, if an excessive amount of water is supplied to the plant which, of course, can easily drown the roots and kill the plant, stem 34 will rise so that indicia 38 and 39 will be above mouth 30a of watering tube 30 to clearly signal the condition. The plant owner will immediately notice this and take the proper steps to remove a sufficient amount of water until the level of water in the reservoir is approximately ¼ inch below screen 24 which will be indicated when indicia mark 39 lies in generally the same plane as mouth 30a of watering tube 30. It is, of course, understood that the rise and fall of the stem 34 with the water is achieved through the spherical float member 36 which may be made from any suitable material, such as cork.

In order to permit spherical float member 36 to freely rise and fall within watering tube 30 to indicate the condition of the water supply in the reservoir at the bottom of the container, it is essential that the lower section of watering tube 30 be unobstructed. For this purpose, the position of stop 31 in the watering tube for preventing accidental withdrawal of the stem 34 is precisely set so that should excessive water be supplied into the reservoir, the stem 34 will be free to sufficiently rise so that the indicia area 38, 39, will be positioned sufficiently above the mouth 30a of watering tube 30 to clearly indicate to the plant owner the excessive condition of the water. That is to say, that if the excessive water level in the container is such as to cause the spherical float member 36 to engage stop 30, the indicia 38 on the stem 34 will be sufficiently positioned above the mouth 30a of the watering tube so that the plant owner can immediately tell that the excessive water condition has been reached.

In one specific embodiment, watering tube 30 has a length of approximately nine inches and the stop 31 is placed four inches above the lower end of the watering tube. In addition, the overall length of the indicia stem 34, including the float 36, is also approximately nine inches and the indicia area 38 between indicia marks 39 and 39a is 1⅛ inches) long. Also in the specific embodiment, the tube 30 and stem 34 are made from rigid plastic material, and the stem is made from ⅛ inch tubing and secured such as by bonding in a passage in float member 36 which has a diameter of ⅜ inch. Watering tube 30 has internal diameter of about ⅞ inch and an outside diameter of about 1 inch. In addition, the depth of the coarse growing medium 26 is approximately 2 inches. Thus, in the specific embodiment described, the maximum water level in the reservoir, as indicated by indicia mark 39 when at the level of mouth 30a of the watering tube 30, is about 1¾ inch. In this way, a space of approximately ¼ inch is established between the maximum water level and screen 24 for the purposes indicated.

Once the plant has been containerized and begins to receive water from the self-watering system in accordance with the present invention, fine growing medium 22 and the plant roots 12 will become moist and begin to grow as the filter paper 37 becomes moist and begins to decompose at which point the fine growing medium will be moist to remain above screen 24 in the absence of a barrier such as filter paper 37. It has been discovered that with the use of the present invention, the plant 10 will develop water roots also termed "specialized roots" which penetrate downwardly through screen 24 and extend into the water reservoir. These water roots 14 give the plant a constant supply of water avoiding water stress. These roots are termed "specialized" because ordinary roots 12, which exist in the fine growing medium 22, would soon die if suddenly covered with water. In contrast, the water roots or specialized roots become acclimatized to the water and do not die but live to fulfill a very important function of ensuring a constant supply of water to the plant. Therefore, it is important that the size of the screen mesh be sufficient to allow the specialized roots 14 to penetrate downwardly through the screen into the water reservoir.

The present invention permits containerization of a plant and yet will ensure rapid plant growth and a healthy plant. Moreover, it will be seen from the above that the present invention provides a constant water supply in precisely the right amount to ensure proper plant growth and to avoid drowning of the plant. The present invention removes guess work in the amount of water that should be supplied to a plant and thus makes caring for the plant much easier. The present invention also avoids the need of a drainage hole in the pot because of the precise self-watering system. Further, the present invention may be used with any container or planter and moreover, can be used for hanging plant containers because dripping from the container is avoided by the present invention.

What is claimed is

1. A planter combination including a container having bottom and upstanding side walls defining a space for receiving a plant and growing mediums, a coarse growing medium located in the bottom of the container and evenly distributed throughout to define a horizontal plane at the top of the coarse growing medium, a screen located in the container in said horizontal plane and being supported by said coarse growing medium and dividing the container into upper and lower compartments with the coarse growing medium located in the lower compartment, a fine growing medium located in the container in the upper compartment and being supported by said screen and ultimately said course growing medium, a watering tube extending generally vertically in the container through the upper and lower compartments and through said screen and having an open upper end and outlet means in a lower end portion for introducing water into the lower compartment, a float located in the passage of the watering tube, said float including a float member and a stem fixed to the float member and projecting upwardly therefrom in the passage of the watering tube, and indicia means on an upper end portion of the stem cooperable with the upper end of the watering tube for indicating when the lower compartment is either empty of water, or contains a maximum predetermined desired level of water situated adjacent to but spaced below said screen to prevent capillary action through said screen, or an excessive level of water above said maximum predtermined desired level, and wherein said indicia means includes a first mark located on the stem to lie generally at the level of the open end of the watering tube when the water in the lower compartment reaches said maximum predetermined desired level spaced below the screen, a second mark on the stem above said first mark adapted to lie generally at the level of the open end of the watering tube when the second compartment is empty of water.

2. The combination defined in claim 1 wherein said maximum predetermined desired level of water is approximately ¼ inch below the screen.

3. The combination defined in claim 1 wherein said stem has a first color in the section between said first and second marks and a second different color in the section below the first mark to facilitate reading.

4. The combination defined in claim 1 wherein said watering tube includes within its passage, stop means engageable with the float member for preventing withdrawal of the float member from the upper end of the watering tube.

5. The combination defined in claim 4 wherein the indicia means is located on the stem such that when the float member engages the stop, the indicia means will be located well above the open end of the watering tube.

6. The combination defined in claim wherein the assembly will accomodate a first set of normal roots located in the upper compartment in the fine growing medium and a second set of water roots projecting downwardly through the screen and into the lower compartment for providing a constant supply of water to the first set of roots in the upper compartment.

7. The combination defined in claim 6 wherein the screen has openings approximately 1/16 inch.

8. As a product of manufacture, a kit for containerizing plants with a self-watering system; the kit comprising in combination, a screen to be placed in a plant container to divide the same into upper and lower compartments; the upper compartment to contain a fine growing medium and the lower compartment to contain a coarse growing medium and a water reservoir, an elongated watering tube adapted to be placed into the container through the screen to extend between the upper and lower container compartments to supply water into the reservoir in the lower container compartment, a float assembly including a float member and attached elongated stem to be received in the water tube to rise and fall with the level of water, the float assembly having indicia means for indicating the level of water, at least one wick to be inserted in the container to extend through the screen between the upper and lower container compartment from the lower container compartment, and a coarse growing medium to be received in the lower container compartment below the screen and to support the screen and to define spaces for receiving water, a sheet of readily decomposable material to be placed in the container in overlying relationship on the screen to prevent the fine growing medium from falling through the screen upon initial introduction into the container, attachment means for attaching the wick to a side wall portion of the associated container in a vertical position, said screen and said sheet of readily decomposable material each having a precut opening with a slit extending from the opening to a margin thereof for facilitating placement of the screen and the sheet of readily decomposable material about the watering tube in an associated container with the watering tube extending through each precut opening, said watering tube having a stop fixed therein intermediate opposite ends thereof to engage the float member to prevent removal of the float member from one end of the watering tube, said stem having indicia means including first and second marks spaced along an upper end portion thereof for clearly indicating when the float member has engaged the stop in the watering tube and for also indicating when the float is positioned at the bottom end of the tube or at a predetermined position adjacent to but below the screen.

9. A planter combination comprising a container having bottom and upstanding walls enclosing a space for receiving a plant, a coarse growing medium in the container resting on the bottom wall of the container with spaces provided between the coarse growing medium and with the coarse growing medium defining a generally horizontal plane at the top of the coarse growing medium, a screen engaged upon and supported by the coarse growing medium dividing the space in the container into an upper compartment above the screen and a lower compartment below the screen, a sheet of permeable and readily decomposable material positioned on said screen and being generally coextensive therewith, a fine growing medium located in the upper compartment and engaged on said sheet of permeable material, whereby a plant located in the container has roots embedded in the fine growing medium, a watering tube having an upper open end and being received in the container and extending through the upper and lower compartments through the fine growing medium, the permeable sheet, the screen, and the coarse growing medium and having outlet means located in the lower compartment for supplying water into the lower compartment in the spaces between the coarse growing medium, the upper end of the watering tube being located generally at the level of the fine growing medium for receiving water, a float located in the watering tube to rise and fall with the level of water in the lower compartment, said float including a float member and a stem fixed to the float member and extending upwardly through the watering tube, said stem having indicia means cooperable with the upper end of the watering tube to indicate when the lower compartment is empty of water, and when the lower compartment contains a predetermined maximum level of water adjacent to but spaced below said screen, and when the water in the container is excessive and extends to a level above the screen, and a wick extending through the upper and lower compartments for transmitting water from the lower compartment into the upper compartment for feeding the plant, and wherein said watering tube has stop means located therein at a position intermediate the opposite ends of the watering tube, said stop means being engageable by said float member to prevent accidental withdrawal of the float member and stem from the upper end of the tube, means attaching said wick to the side wall of the container and means attaching said watering tube to the side wall of the container, and wherein said screen and said permeable sheet have precut openings receiving said watering tube.

10. The combination defined in claim 9 wherein the screen has openings approximately 1/16 inch for permitting the plant to develop water roots to extend through the screen and into the lower compartment for assuring a constant supply of water to the plant.

11. The combination in claim 9 wherein said watering tube is located adjacent the side wall of the container and wherein said screen and said permeable sheet have slits formed therein extending between the opening therein and adjacent marginal edge portions thereof.

12. A method of containerizing a plant with a self-watering system comprising the steps of placing a coarse growing medium in the bottom of a container having bottom and upstanding walls enclosing a space for receiving a growing medium and a plant, placing at least one elongated wick in the container to extend at least partially vertically in the container with a bottom portion of the wick engaging the bottom of the container and with the top of the wick terminating at a first level substantially above the bottom of the container, placing a hollow watering tube vertically in the container with the bottom of the tube engaged against the bottom of the container and with the top of the tube lying adjacent said first level, introducing a coarse growing medium in the bottom of the container to a second level spaced below said first level and evenly distributing the coarse growing medium throughout the container so as to define a generally horizontal plane at the top of the coarse growing medium, placing a screen in the container over the coarse growing medium to be supported by the coarse growing medium in said plane at the top of the coarse growing medium, placing a sheet of permeable and readily decomposable material over the screen to extend substantially throughout the area of the screen, placing a fine growing medium in the container to rest on the said sheet and to extend to an uppermost level adjacent said first level, introducing a plant in the container above said screen and with the roots of the plant located in the fine growing medium adjacent said screen, and introducing water into the watering tube to be discharged into the container below said screen to a level spaced below the level of the screen, and wherein before inserting the tube in the container, a float is introduced in the watering tube for indicating the level of water in the container, and wherein said wick and watering tube with the float therein are introduced into the container prior to introducing the coarse growing medium into the container, and wherein the wick and watering tube are attached to the sides of the container prior to introducing the coarse growing medium, and wherein the fine growing medium is introduced in the container to a first layer adjacent said screen and then the plant is introduced in the container with its roots placed in the first layer of the fine growing medium, and then a second layer of fine growing medium is introduced into the container on top of the first layer of fine growing medium and around the roots of the plant, and wherein said screen and said sheet of readily decomposable material each have precut openings with slits extending from the opening to a margin thereof for facilitating placement of the screen and the sheet of readily decomposable material in the container after the watering tube has been placed in and attached to the container and with the watering tube received through the precut openings.

* * * * *